United States Patent Office 3,547,893
Patented Dec. 15, 1970

3,547,893
POLYMERS DERIVED FROM DIAMINES OR AMINOALCOHOLS AND TRIALKYL OR TRIARYL PHOSPHITES
Richard L. McConnell and Harry W. Coover, Jr., Kingsport, Tenn., assignors to Eastman Kodak Company, Rochester, N.Y., a corporation of New Jersey
No Drawing. Application Oct. 17, 1966, Ser. No. 587,945, now Patent No. 3,377,409, dated Apr. 9, 1968, which is a continuation of application Ser. No. 271,844, Apr. 10, 1963. Divided and this application Apr. 2, 1968, Ser. No. 718,224
Int. Cl. C08g 22/02, 22/04
U.S. Cl. 260—77.5                         11 Claims

ABSTRACT OF THE DISCLOSURE

Flame-resistant, linear, and cross-linked phosphorus-containing polymers are prepared from the reaction of [A] an organic phosphite—e.g., triethyl phosphite, triphenyl phosphite, and [B] a compound having at least one amino group—e.g., ethylenediamine; 1,4-cyclohexanebis(methylamine); 5-aminopentanol.

---

This application is a division of McConnell and Coover U.S. Ser. No. 587,945, filed Oct. 17, 1966, now U.S. Pat. No. 3,377,409, granted on Apr. 9, 1968, which is, in turn, a continuation of McConnell and Coover U.S. Ser. No. 271,884, filed Apr. 10, 1963 now abandoned.

This invention relates to new polymeric materials containing phosphorus, and to their preparation. The invention particularly concerns both linear and cross-linked polymers derived from the reactions of certain organic phosphites with certain compounds containing at least one amino group.

The linear polymers of the invention contain the recurring group represented by the formula:

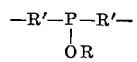

wherein R is selected from the group consisting of a monovalent aliphatic radical, a monovalent alicyclic radical, and a monovalent aryl radical, and wherein R' is a divalent radical selected from the group consisting of:

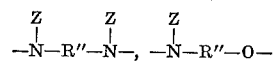

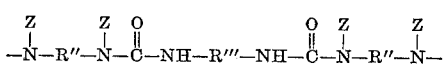

and

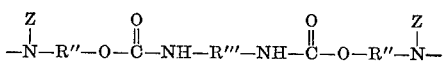

wherein R" is selected from the group consisting of a divalent alicyclic radical, a divalent aryl radical, a divalent aliphataic radical and

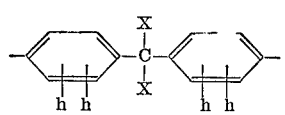

wherein x is selected from the group consisting of a hydrogen atom, a monovalent aliphatic radical, a monovalent alicyclic radical, and a monovalent aryl radical, wherein h is selected from the group consisting of a hydrogen atom, a chlorine atom, and a bromine atom, wherein R''' is selected from the group consisting of a divalent aliphatic radical, a divalent alicyclic radical, and a divalent aryl radical, and wherein Z is selected from the group consisting of a hydrogen atom, a monovalent alkyl radical, a monovalent alicyclic radical, and a monovalent aryl radical.

The cross-linked polymers of the invention contain the recurring group represented by the formula:

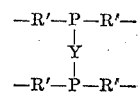

wherein R' is as defined above and Y is a divalent substance selected from the group represented by the formulas:

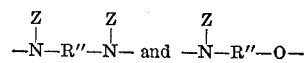

wherein R" and Z are as defined above.

Heretofore, it was thought that heating a mixture of a phosphite, for example, a trialkyl phosphite, and a diamine or aminoalcohol would result in alkylation of the amine rather than formation of a linear polymer. Consequently, the polymers of the present invention which are of high molecular weight and highly flame resistant were not considered possible.

A principal object of the invention, therefore, is to provide new phosphorus-containing polymers useful in their linear states and capable of cross-linking to dimensionally stable, insoluble products formable into fibers, sheets, and films. Further objects shall become apparent from the following description and claims.

The linear polymers having the above general formula:

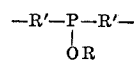

are obtained according to the following reactions:

(A)
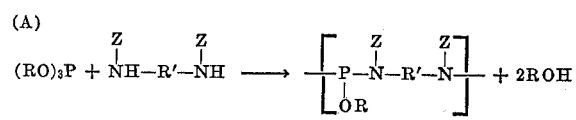

(B)
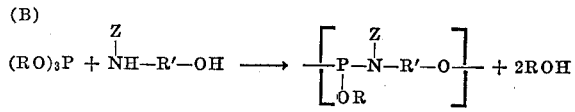

(C)
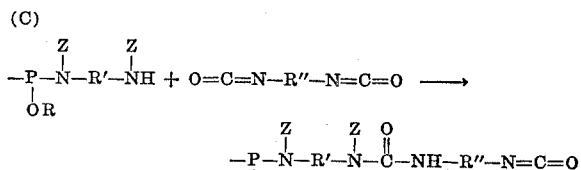

(D)
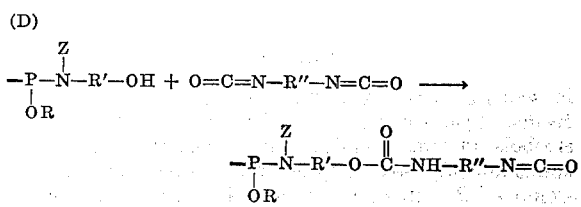

wherein R, R', R", and Z are as defined above. Reactions (C) and (D) are carried out using the phosphorus-containing products of reactions (A) and (B) having terminal $$-\overset{Z}{\underset{|}{N}}H \text{ and } -OH$$

groups, respectively.

Also according to the invention, the phosphorus-containing reaction products obtained by using a mixture of

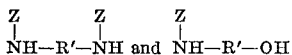

and containing both amino and alcohol end groups may be reacted with diisocyanates to give products having recurring structural units such as (E) below:

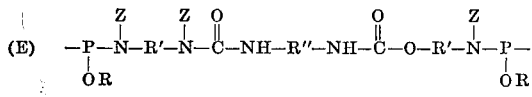

wherein R, R', R", and Z are as defined above.

In preparing the cross-linked polymers having recurring groups of the formula:

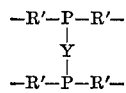

wherein R' and Y are as defined above, the reaction temperature was carefully controlled below about 200° C. until the third —OR group was removed from the phosphorus and cross-linking by the amine or amino alcohol occurred.

The products of this invention are flame resistant and may be advantageously employed for the color stabilization of other polymeric materials such as polyesters, polyamides, or polyolefins. The high molecular weight polymers may be cast into flame-resistant films or molded into shaped articles.

Suitable phosphites which may be used in this invention include the trimethyl, triethyl. tributyl, triisobutyl, trioctyl, tris(2-ethylhexyl), trilauryl, triphenyl, tritolyl, and tricyclohexyl phosphites. It is also possible to use mixed phosphites such as the methyldiethyl, ethyldibutyl, ethyldiphenyl, 2 - ethylhexyldiphenyl, and diphenyltolyl phosphites.

Suitable diamines which may be used in this invention include aliphatic ethylenediamine; 1,4-butanediamine; 1,6 - hexanediamine; 1,10-decanediamine; and 1,12-dodecanediamine. Also, alicyclic diamines such as 1,4-cyclohexanediamine; 1,3-cyclohexanediamine; 1,4-cyclohexanebis(methylamine); 1,3-cyclohexanebis(methylamine); 1,4-cyclooctanediamine; 1,5-cyclooctanediamine; 1,4-cyclododecanediamine; 1,5-cyclododecanediamine; 2,2,4,4-tetramethyl-1,3-cyclobutanediamine; and piperazine may be used. Useful aromatic diamines include p-phenylenediamine; 4,4' - isopropylidenedianiline; durenediamine; 4,4' - methylenedianiline; 4,4'-methylenebis(3-chloroaniline); 4,4'-methylenebis(3-bromoaniline); 4,4'-methylene bis(2,5 - dichloroaniline); 4,4' - methylenebis(2,5-dibromoaniline); and related compounds. Substituted diamines such as N,N'-dimethyl-1,6-hexanediamine; N,N'-dicyclohexyl - 1,6-hexanediamine; and N,N'-diphenyl-1,6-hexanediamine are also operable. Suitable amino alcohols include those having the general structure

in which Z is H, alkyl, cycloalkyl, or aryl, and R' is a divalent hydrocarbon group. Examples of such aminoalcohols include 2-aminoethanol; 3-aminopropanol; 4-aminobutanol; 4-aminopentanol; 5-aminopentanol; 3-amino - 2,2 - dimethyl-1-propanol; 6-aminohexanol; 8-aminooctanol; 4-amino-1-cyclohexanol; 4 - aminomethylcyclohexanemethanol; N-ethylaminoethanol; 3-(ethylamino) - 2,2 - dimethyl-1-propanol; p-aminophenol; N-phenylaminoethanol; and 3 - amino-2,2,4,4 - tetramethyl cyclobutanol.

In order to obtain high molecular weight products, it is desirable to use approximately equimolar amounts of the phosphite and the diamine or the aminoalcohol; however, it is sometimes desirable to use an excess of the diamine or amino-alcohol so that a product containing amino or hydroxy end groups may be obtained. Such products, as mentioned above, may be subsequently reacted with diisocyanates to produce high melting polyureas or polyurethanes. It is sometimes desirable to use a mixture of two or more diamines to impart certain specific properties to the phosphorus-containing polymers.

In general, the condensation of the diamine with the phosphite is conducted in the absence of a solvent. Inert solvents may be used, however, if desired. The operable temperature range of this reaction is about —25° C. to about 300° C. In general, the condensations are initiated at room temperature and completed at a somewhat higher temperature, for example, final temperatures of approximately 250° C. are especially suitable. Catalysts are not required for the reaction. It is advantageous to use decreased pressure toward the end of the reaction in order to remove the liberated alcohol or phenol. The end products are either extremely viscous liquids or white solid products.

If a product containing amino or both amino and alcohol end groups is reacted with a diisocyanate, it is advantageous to use an inert solvent such as the hydrocarbons, ethers, esters, and ketones, since the reactions are extremely exothermic. In this final condensation, it is advantageous to have equivalent amounts of the diisocyanate and the intermediate organophosphorous material in order to obtain high molecular weight polymers.

The following examples will further serve to illustrate the invention.

EXAMPLE 1

Polymer derived from triethyl phosphite and 1,6-hexanediamine

Anhydrous 1,6-hexanediamine (0.2 mole) was mixed with triethyl phosphite (0.2 mole) and heated in the presence of nitrogen. As the reaction temperature reached approximately 125° C., ethyl alcohol was liberated. The evolved ethyl alcohol was distilled from the reaction mixture as formed. The reaction was conducted until the theoretical amount of ethyl alcohol had been liberated (0.4 mole). The maximum reaction temperature used was 250° C. and vacuum was employed during the later stages of the reaction to remove the last traces of ethyl alcohol. This polymeric material was an extremely viscous, colorless oil at 250° C. and a white solid at 25° C. An infrared spectrum of the product indicates bands for —NH— groups and POC$_2$H$_5$ groups, and this spectrum is compatible with the recurring structure:

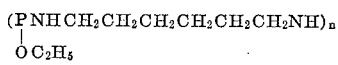

Similar polymeric materials were obtained when triethyl phosphite was treated with 1,4-cyclohexanebis-(methylamine); p-phenylenediamine; and N,N'-dimethyl-1,6-hexanediamine. Similar results were also obtained when trimethyl phosphite, trilauryl phosphite, triphenyl phosphite, and ethyl diphenyl phosphite were used instead of triethyl phosphite.

EXAMPLE 2

Polyurea from the reaction product of triethyl phosphite and 1,6-hexanediamine

Anhydrous 1,6-hexanediamine (0.4 mole) and triethyl phosphite (0.38 mole) were reacted according to the procedure of Example 1 to produce a low molecular weight product containing amino end groups. About one gram of this product was treated with one gram of 2,4-tolylene diisocyanate. An extremely vigorous reaction took place and a white solid polymer was obtained immediately. This polymer was insoluble in acetone and benzene but it was partially soluble in hot dimethyl formamide. Films cast from this hot solution were transparent, tough, and had excellent flame resistance. The polymer may be represented by the recurring structural unit:

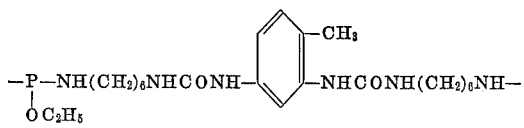

Similar polymers were obtained using 4,4'-diphenylmethane diisocyanate and 1,4-cyclohexylenedimethylene isocyanate instead of the 2,4-tolyene diisocyanate.

EXAMPLE 3

Polymer derived from triethyl phosphite and 4-aminomethylcyclohexanemethanol

Triethyl phosphite (0.2 mole) and 4-aminomethylcyclohexanemethanol (0.2 mole) were reacted according to the procedure described in Example 1 to produce a polymeric product which may be represented by the recurring structural unit:

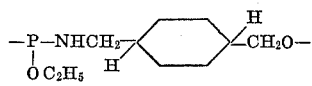

Similar results were obtained using other trialkyl or triaryl phosphites and other aminoalcohols.

EXAMPLE 4

Polyurethane from the reaction product of triethyl phosphite and 5-aminopentanol Triethyl phosphite (0.2 mole) and 5-aminopentanol (0.23 mole) were reacted according to the procedure of Example 1 to produce a low molecular weight prepolymer. When this material was treated with hexamethylene diisocyanate, a high molecular weight polymer was formed which consisted essentially of the recurring structural unit:

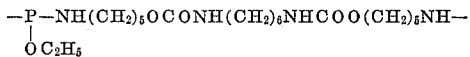

Similar results were obtained using 4,4'-diphenylmethane diisocyanate; 2,4-tolylene diisocyanate; or 1,4-cyclohexylenedimethylene isocyanate instead of the hexamethylene diisocyanate.

EXAMPLE 5

Polymers derived from triphenyl phosphite and 1,4-cyclohexanebis(methylamine)

Triphenyl phosphite (0.1 mole) and 1,4-cyclohexanebis(methylamine) (0.1 mole) were mixed and heated to 180° C. with stirring for 1.5 hours in the presence of dry nitrogen. The temperature of the reaction mixture was lowered to 120° C. and vacuum was gradually applied to remove the liberated phenol. The temperature was gradually raised to about 180° C. at a pressure of about one mm. of Hg and maintained under these conditions until the theoretical amount of phenol (0.2 mole) had been removed. The viscosity of the melt increased as the reaction proceeded and the final melt is an extremely viscous, light amber oil at 200° C. The molecular weight of this product is greater than 1,000 and its structure may be represented by the recurring structural unit:

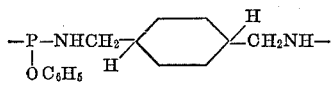

Similar results were obtained using butyl diphenyl phosphite or dibutyl phenyl phosphite instead of the triphenyl phosphite except that a mixture of butyl alcohol and phenol was removed during the course of the reaction rather than phenol alone. The reaction was repeated except that 0.1 gram of sodium methoxide was added to the reaction mixture. The sodium methoxide acted as a catalyst and accelerated the removal of the phenol. Other compounds found to have a catalytic effect included sodium phenoxide, sodium amide, lithium phenoxide, zinc acetate, and diphenyl hydrogen phosphite.

EXAMPLE 6

Cross-linked polymer derived from triphenyl phosphite and N,N'-dimethyl-1,4-cyclohexanebis(methylamine)

Triphenyl phosphite (0.2 mole) and N,N'-dimethyl-1,4-cyclohexanebis(methylamine) (0.3 mole) were reacted according to the procedure of Example 5 except that the maximum reaction temperature was 200° C. A total of 0.51 mole of phenol was removed during the reaction and this cross-linked product may be represented by the recurring structural unit:

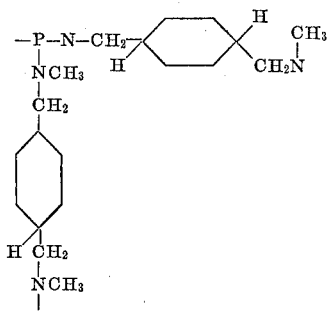

Treatment of this polymer with hexamethylene diisocyanate yielded a highly cross-linked material which is insoluble and infusible. The reaction was repeated using 0.1 gram of sodium methoxide as a catalyst to facilitate the removal of the phenol. Similar results were obtained using sodium diphenyl phosphite and also diphenyl hydrogen phosphite as catalysts. Similar results were also obtained when piperazine was used instead of the N,N'-dimethyl-1,4-cyclohexanebis(methylamine).

EXAMPLE 7

Polymer derived from tricyclohexyl phosphite and 2,2,4,4-tetramethylcyclobutanediamine Tricyclohexyl phosphite (0.2 mole) and 2,2,4,4-tetramethylcyclobutanediamine (0.2 mole) were reacted according to the procedure of Example 5 to liberate cyclohexanol and produce a polymeric material which may be represented by the recurring structural unit:

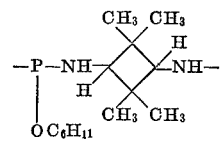

Similar results were obtained using dicyclohexyl ethyl phosphite, cyclohexyl diphenyl phosphite, or butyl cyclohexyl tolyl phosphite instead of the tricyclohexyl phosphite.

EXAMPLE 8

Cross-linked polymer derived from tritolyl phosphite and 3-(methylamino)-2,2-dimethyl-1-propanol Tritolyl phosphite (0.2 mole) and 3-(methylamino-2,2-dimethyl-1-propanol) (0.3 mole) were reacted according to the procedure of Example 5. A total of 0.52 mole of cresol was removed during the reaction and the cross-linked, light amber product may be represented by the recurring structural unit:

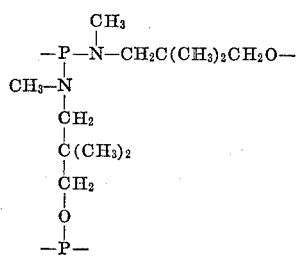

Treatment of this polymer with tolylene diisocyanate gave a highly cross-linked material which is insoluble and infusible.

EXAMPLE 9

Polymer derived from triphenyl phosphite and 4,4'-methylenebis(3-chloroaniline)

Triphenyl phosphite (0.1 mole) and 4,4'-methylenebis-(3-chloroaniline) (0.1 mole) were reacted according to the procedure of Example 5. The theoretical amount of phenol (0.2 mole) was removed and the structure of this solid polymeric product may be represented by the recurring structural unit:

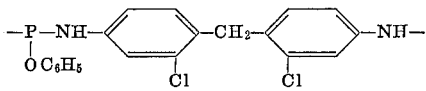

Similar results were obtained when 4,4'-methylenebis(3-bromoaniline) or 4,4'-methylenebis(2,5-dichloroaniline) were used instead of the 4,4'-methylenebis(3-chloroaniline).

EXAMPLE 10

Polymer derived from triphenyl phosphite, diphenyl hydrogen phosphite, and 4,4'-methylenedianiline Triphenyl phosphite (0.02 mole), diphenyl hydrogen phosphite (0.08 mole), and 4,4'-methylenedianiline (0.1 mole) were reacted according to the procedure of Example 5. The theoretical amount of phenol was obtained

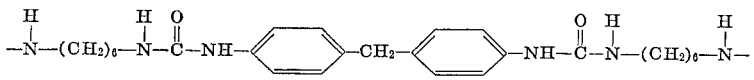

(0.2 mole) and the structure of the polymer obtained may be represented by the recurring structural units:

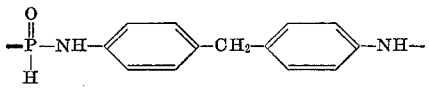

and

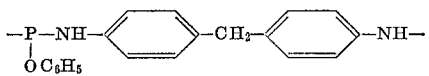

Similar results are obtained using other molar ratios of triphenyl phosphite and diphenyl hydrogen phosphite. For example, the molar ratio of triphenyl phosphite to diphenyl hydrogen phosphite may be varied from 95/5 to 5/95. Similarly, good results are obtained using mixtures of trialkyl and dialkyl hydrogen phosphites such as mixtures of triethyl phosphite and diethyl hydrogen phosphite, mixtures of tributyl phosphite and dibutyl hydrogen phosphite or mixtures of triphenyl phosphite and dibutyl hydrogen phosphite. Similar results are also obtained using an aminoalcohol such as 4-aminomethylcyclohexanemethanol instead of the diamine.

The invention has been described in detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. Linear polymers containing the recurring group

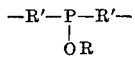

wherein R is selected from the group consisting of an alkyl radical, a cycloalkyl radical, and an aryl radical, and wherein R' is a divalent radical selected from the group represented by the formulas

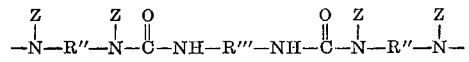

and

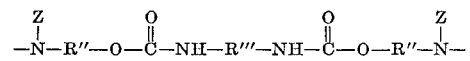

wherein R'' is selected from the group consisting of an alkylene radical, a cycloalkylene radical, and an arylene radical, and wherein Z is selected from the group consisting of a hydrogen atom, an alkyl radical, a cycloalkyl radical, and an aryl radical.

2. A linear polymer as defined by claim 1 and containing the recurring group

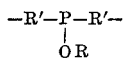

wherein R is ethyl and R' is

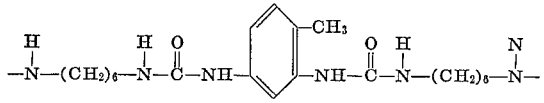

3. A linear polymer as defined by claim 1 and containing the recurring group

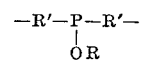

wherein R is ethyl and R' is

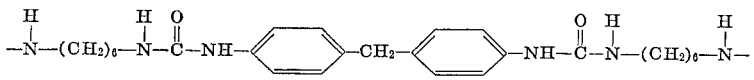

4. A linear polymer as defined by claim 1 and containing the recurring group

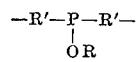

wherein R is ethyl and R' is

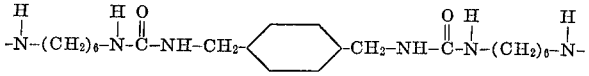

5. A linear polymer as defined by claim 1 and containing the recurring group

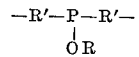

wherein R is ethyl and R' is

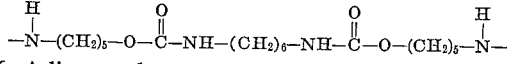

6. A linear polymer as defined by claim 1 and containing the recuring group

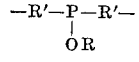

wherein R is ethyl and R' is

7. A linear polymer as defined by claim 1 and containing the recurring group

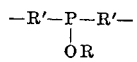

wherein R is ethyl and R' is

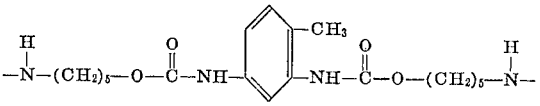

8. A linear polymer as defined by claim 1 and containing the recurring group

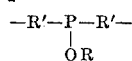

wherein R is ethyl and R' is

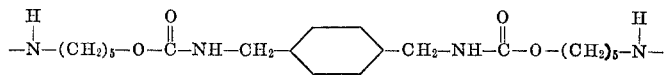

9. Cross-linked polymers containing the recurring group

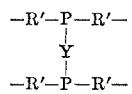

wherein R' is a divalent radical selected from the group represented by the formulas

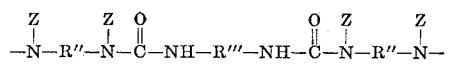

and

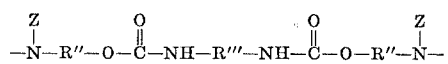

wherein R'' is selected from the group consisting of an alkylene radical, a cycloalkylene radical, and an arylene radical, wherein Z is selected from the group consisting of a hydrogen atom, an alkyl radical, a cycloalkyl radical, and an aryl radical, and wherein Y is a divalent radical selected from the group represented by the formulas

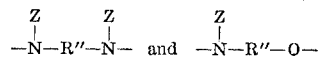

wherein R'' and Z are as defined above.

10. A cross-linked polymer as defined by claim 9 and containing the recurring group

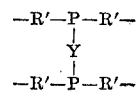

wherein Y is

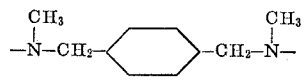

and R' is

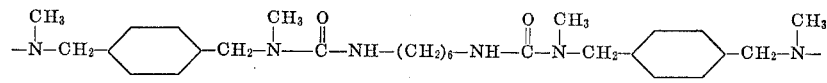

11. A cross-linked polymer as defined by claim 9 and containing the recurring group

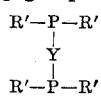

wherein Y is

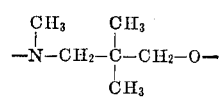

and R' is

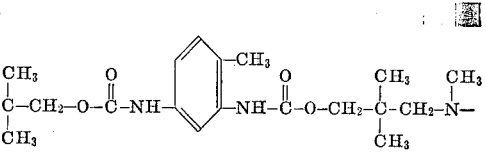

References Cited

UNITED STATES PATENTS 3,153,013  10/1964  Campbell _____ 260—77.5

DONALD E. CZAJA, Primary Examiner

M. J. WELSH, Assistant Examiner

U.S. Cl. X.R.

260—45.9

PO-1050
(5/69)

UNITED STATES PATENT OFFICE
CERTIFICATE OF CORRECTION

Patent No. 3,547,893                     Dated December 15, 1970

Inventor(s) Richard L. McConnell and Harry W. Coover, Jr.

It is certified that error appears in the above-identified patent and that said Letters Patent are hereby corrected as shown below:

In Claim 2, Column 8, the second formula should read:

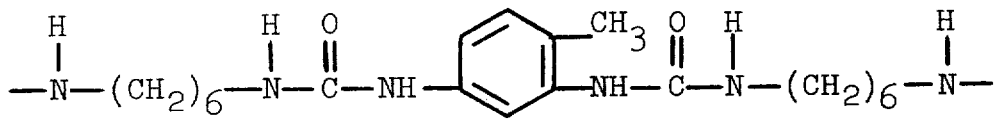

Signed and sealed this 20th day of April 1971.

(SEAL)
Attest:

EDWARD M. FLETCHER, JR.　　　　　　　　　WILLIAM E. SCHUYLER, JR.
Attesting Officer　　　　　　　　　　　　Commissioner of Patents